United States Patent
Kvochko et al.

(10) Patent No.: US 11,397,860 B2
(45) Date of Patent: Jul. 26, 2022

(54) AGGREGATED SENTIMENT ANALYSIS SYSTEM FOR THREAT PROTECTION

(71) Applicant: Bank of America Corporation, Charlotte, NC (US)

(72) Inventors: Elena Kvochko, New York, NY (US); Michael Ogrinz, Easton, CT (US)

(73) Assignee: Bank of America Corporation, Charlotte, NC (US)

( * ) Notice: Subject to any disclaimer, the term of this patent is extended or adjusted under 35 U.S.C. 154(b) by 243 days.

(21) Appl. No.: 16/732,417

(22) Filed: Jan. 2, 2020

(65) Prior Publication Data

US 2021/0209306 A1    Jul. 8, 2021

(51) Int. Cl.
| | | |
|---|---|---|
| *G06F 40/30* | (2020.01) | |
| *G06F 40/295* | (2020.01) | |
| *H04L 51/046* | (2022.01) | |
| *H04L 9/40* | (2022.01) | |

(52) U.S. Cl.
CPC ............ *G06F 40/30* (2020.01); *G06F 40/295* (2020.01); *H04L 51/046* (2013.01); *H04L 63/14* (2013.01)

(58) Field of Classification Search
CPC ..... G06F 40/30; G06F 40/295; H04L 51/046; H04L 63/14; H04L 63/1425
See application file for complete search history.

(56) References Cited

U.S. PATENT DOCUMENTS

| | | | |
|---|---|---|---|
| 1,026,199 | A | 5/1912 | Bullard |
| 7,136,877 | B2 | 11/2006 | Volcani et al. |
| 9,282,070 | B2 | 3/2016 | Haugen et al. |
| 9,471,883 | B2 | 10/2016 | Chatterjee et al. |
| 10,007,661 | B2 | 6/2018 | Arquero et al. |
| 10,031,909 | B2 | 7/2018 | Blaschak et al. |
| 10,050,926 | B2 | 8/2018 | Ebersman et al. |
| 10,353,898 | B2 | 7/2019 | Kawecki, III |
| 11,165,991 | B2 * | 11/2021 | Peters ................... H04N 7/152 |
| 2014/0337257 | A1 | 11/2014 | Chatterjee et al. |

(Continued)

OTHER PUBLICATIONS

"7 Reasons Why Customer Reviews are Important," https://www.e-satisfaction.com/7-reasons-why-customer-reviews-are-important/, e-satisfaction, Retrieved on Nov. 20, 2019.

(Continued)

*Primary Examiner* — Stella L. Woo
(74) *Attorney, Agent, or Firm* — Weiss & Arons LLP

(57) ABSTRACT

A system for aggregating sentiment analysis of communications between a plurality of entity groups is provided. The system may include a plurality of entity groups. Each entity group may include one entity, two entities or a plurality of entities. The system may include a plurality of communications. Each of the communications may be transmitted from a first entity. A first entity group may include the first entity. The plurality of entity groups may include the first entity group. Each of the communications may be transmitted to a second entity. The second entity may be included in a second entity group. The second entity group may be included in the plurality of entity groups. The system may also include a sentiment score determination module. The sentiment score determination module may determine an aggregate sentiment score for the plurality of communications. The sentiment score may determine a communication threat level.

20 Claims, 7 Drawing Sheets

(56) References Cited

U.S. PATENT DOCUMENTS

| | | | | |
|---|---|---|---|---|
| 2015/0195406 | A1* | 7/2015 | Dwyer | G10L 15/26 |
| | | | | 379/265.07 |
| 2016/0300135 | A1* | 10/2016 | Moudy | G06F 40/30 |
| 2017/0185921 | A1 | 6/2017 | Zhang | |
| 2017/0353605 | A1* | 12/2017 | Dumaine | G06Q 10/063112 |
| 2018/0054691 | A1* | 2/2018 | Sharifi | H04L 67/42 |
| 2018/0089171 | A1 | 3/2018 | Arquero et al. | |
| 2018/0218335 | A1* | 8/2018 | Jenkins | H04L 67/22 |
| 2020/0065375 | A1* | 2/2020 | Anders | H04L 51/16 |

OTHER PUBLICATIONS

"Plutchik's Wheel of Emotions," https://www.6seconds.org/2017/04/27/plutchiks-model-of-emotions/, Six Seconds, Retrieved on Nov. 18, 2019.

Zhang et al. "Deep Learning for Sentiment Analysis: A Survey," https://arxiv.org/vc/arxiv/papers/1801/1801.07883v1.pdf, Retrieved on Nov. 12, 2019.

Ross Marchant, "The Impact of Online Reviews on Businesses," https://www.brightlocal.com/blog/the-impact-of-online-reviews/, BrightLocal Ltd., Mar. 15, 2017.

"Sentiment Analysis," https://en.wikipedia.org/wiki/Sentiment_analysis, Wikimedia Foundation, Inc., Nov. 4, 2019.

"Sentiment Analysis Examples," https://monkeylearn.com/sentiment-analysis-examples/, MonkeyLearn Inc., Retrieved on Nov. 12, 2019.

"Sentiment Analysis," https://monkeylearn.com/sentiment-analysis/, MonkeyLearn Inc., Retrieved on Nov. 12, 2019.

Google Search 1: "Sentiment Lexicons," google.com, Retrieved on Nov. 12, 2019.

Google Search 2: "Sentiment Lexicons," google.com, Retrieved on Nov. 12, 2019.

Bruno Stecanella, "Trump vs. Hillary: Sentiment Analysis on Twitter Mentions," https://monkeylearn.com/blog/trump-vs-hillary-sentiment-analysis-twitter-mentions/, Oct. 20, 2016.

"How to Visualize Email Sentiment with Python," https://indico.io/blog/email-sentiment/, Indico Data Solutions, Inc., Apr. 16, 2015.

* cited by examiner

COMMUNICATION A<-->E SENTIMENT ANALYSIS REPORT

| | | |
|---|---|---|
| 702 | Letters | Total Count: 52, 25 scored between 66-100%, 15 scored between 33-66% and 12 scored between 0-33%. — 714 |
| 704 | IMS | Total Count: 87, 35 scored between 66-100%, 20 scored between 33-66% and 32 scored between 0-33%. — 716 |
| 706 | Chat | Total Count: 560, 203 scored between 66-100%, 107 scored between 33-66% and 250 scored between 0-33%. — 718 |
| 708 | Email | Total Count: 957, 410 scored between 66-100%, 447 scored between 33-66% and 100 scored between 0-33%. — 720 |
| 710 | SMS | Total Count: 1234, 865 scored between 66-100%, 229 scored between 33-66% and 140 scored between 0-33%. — 722 |
| 712 | Phone Call | Total Count: 45, 15 scored between 66-100%, 20 scored between 33-66% and 10 scored between 0-33%. — 724 |

FIG. 7

AGGREGATED SENTIMENT ANALYSIS SYSTEM FOR THREAT PROTECTION

FIELD OF TECHNOLOGY

This disclosure relates to sentiment analysis.

BACKGROUND OF THE DISCLOSURE

Since the advent of the digital world, the internet has provided and continues to provide a source of opinionated information. This information may be culled from a variety of internet channels in which an entity may voice an opinion. Such internet channels may include blogs, emails, social media, chats, text messaging, message services or any other suitable opinion-voicing channel. Because of the ease associated with providing opinions, testimonials and comments on the internet, there has been a proliferation of written opinions available regarding a wide variety of topics.

Opinionated information is used by various industries for a variety of purposes. Opinions may be used to understand the public's attitude towards a product, company or relationship. Public discourse in online sources, such as social media, may be correlated with the occurrence of real-world behavior.

It would be desirable to analyze the sentiment of publicly available opinionated data to provide predictive indicators of threats and/or cyberattacks.

It would be further desirable to analyze the sentiment of publicly available opinionated data to detect and remediate difficulty or ease in the communications between groups within an organization.

It would be yet further desirable to analyze the sentiment of publicly available opinionated data to optimize communications between separate organizations.

SUMMARY OF THE DISCLOSURE

A method for aggregating and analyzing the sentiment of communications within a plurality of entity groups is provided. The plurality of entity groups may include a first entity group and a second entity group. Each entity group may include one or more entities. Each entity may be associated with one or more artifacts. For the purposes of this application, an artifact may be understood to refer to a documented communication such as a letter, an IMS ("instant messaging service"), chat, email, short message service ("SMS") and phone call. An artifact may refer to any other suitable communication between entities.

The method may include mining a plurality of artifacts. Each artifact may be transmitted from a transmitting entity to a receiving entity. Therefore, each artifact may be documented as being associated with a transmitting entity—i.e., the entity that transmitted the artifact—and a receiving entity—i.e., the entity that received the artifact. The transmitting entity and/or the receiving entity may be included in an entity group included in the plurality of entity groups.

The method may include determining a sentiment score for each artifact. The sentiment score determination may be based on plurality of processes. Such processes may include natural language processing, computational linguistics, biometrics and text analysis.

Natural language processing may involve computer-based, human-like communication and interaction with computers. Natural language processing enables computers to decipher human conversation and text written in regularly-used languages, such as English, Spanish, French, etc.

Computational linguistics may involve computer-implemented methodologies directed to analyzing and deciphering expressions and vocabularies.

Biometrics may involve utilizing identifying human characteristics to determine information regarding an artifact. Such human characteristics may include body temperature, tone of voice or other suitable non-identifying human characteristics.

Text analysis may include analyzing key words and phrases within the artifact. Analyzing key words and/or phrases may draw upon definitions located in a key word and phrase sentiment library. A key word and phrase sentiment library may include a plurality of key words and phrases, and one or more sentiments, or sentiment scores, associated with each key word and/or phrase.

Text analysis may include analyzing emoticons and/or emojis within the artifact. Analyzing emoticons and/or emojis may draw upon definitions located in an emoticon and/or emoji library or list. An emoticon and/or emoji library or list may include a plurality of emoticons and/or emojis, and one or more sentiments, or sentiment scores, associated with each emoji or emoticon.

Text analysis may include analyzing characters within the artifact. Characters may include (American Standard Code for Information Interchange) ("ASCII") characters, non-ASCII characters or any other suitable character set.

Text analysis may include analyzing the length of an artifact, and the length of a response to the artifact. For example, a relatively short artifact, or short response, may indicate an abrupt artifact; a relatively long artifact, or long response, may indicate a clearly illustrated artifact.

Text analysis may include analyzing response time between the transmission of multiple artifacts. For example, receiving a response shortly after the transmission may indicate urgency; receiving a response a substantial time after transmission may indicate insignificance.

Text analysis may include analyzing related artifacts. Related artifacts may fill in details ostensibly missing from an artifact. For example, a short artifact may typically indicate an abrupt response. However, a short artifact transmitted in response to an invitation may be considered an artifact with positive sentiment.

Text analysis may include analyzing negation. Negation may involve an indication that the spoken or written word should be understood in a manner opposite its accepted definition. Examples of negation may include writing "#NOT" after a comment.

Text analysis may include analyzing exaggerations. Text analysis may also include analyzing jokes. Text analysis may also include analyzing sarcasm. The text analysis may combine various components to determine the sentiment of an artifact.

The method may include determining a transmitting entity and a receiving entity of the artifact. The method may include determining a first entity group that includes the transmitting entity. The method may include identifying a second entity group that includes the receiving entity.

The method may include adding the sentiment score, determined for the artifact, to an aggregated sentiment score. The aggregated sentiment score may be specific to a communication link that links the first entity group to the second entity group. The method may include generating an updated aggregated sentiment score for the communication link that links the first entity group to the second entity group.

An aggregated sentiment score that is determined to be above a predetermined threshold, may indicate negativity or unease between the two communicating entity groups. The method may include identifying communication links that include an aggregated sentiment score above a predetermined threshold.

Lower levels of negativity or unease, or aggregated sentiment scores above the predetermined threshold and below a second predetermined threshold, may indicate strained communications between the two entity groups. Higher levels of negativity or unease, or aggregated sentiment scores above the second predetermined threshold, may indicate real or perceived threats or risks to one or both of the entity groups.

It should be appreciated that strained communications, when left neglected, may escalate into threats and/or risks for either one or both of the entities. Therefore, in order to reduce aggregated sentiment scores from rising above the second predetermined threshold, an action plan, or early warning system may be instituted. The action plan or early warning system may initiate an action plan. The action plan may include a plurality of remediation actions. The remediation actions may be configured to promote positivity and reduce negativity in artifacts between communicated between the two entities.

The aggregated sentiment scores that rank higher than the predetermined threshold may be collected and ranked based on score. Aggregated sentiment scores that rank higher in negativity may be processed prior to scores that rank lower in negativity. For example, a predetermined threshold may be 50% negativity. Two aggregated sentiment scores may be identified as above the 50% negativity predetermined threshold. The two aggregated sentiment scores may include 55% and 95% negativity scores. As such, the aggregated sentiment score that indicates 55% negativity may be ranked lower, and therefore processed after, the aggregated sentiment score that indicates 95%.

The aggregated sentiment scores may be available on a dashboard for a remediation agent to review and implement one or more action plans. The actions plans may include reorganization, halting communications, rerouting communications, responding to perceptions, trust-building communications and other suitable forms of remediation.

The method may include escalating the identified communication links. In some embodiments, the escalating may include halting all communications between the first entity group and the second entity group. In other embodiments, the escalating may include various other remediation measures. Such measures may include further analysis, sending reinforcements, sending remediators, blocking communications, rerouting communications and/or other suitable remediation measures.

In some embodiments, the transmitting entity and the receiving entity may be the same entity, or within the same entity group. In such embodiments, the communication link may be circular, and the analysis may be performed within the single entity group. The analysis may be indicative of sentiment within the entity group.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 7 shows yet another illustrative diagram in accordance with principles of the disclosure.

DETAILED DESCRIPTION OF THE DISCLOSURE

Figure 1:
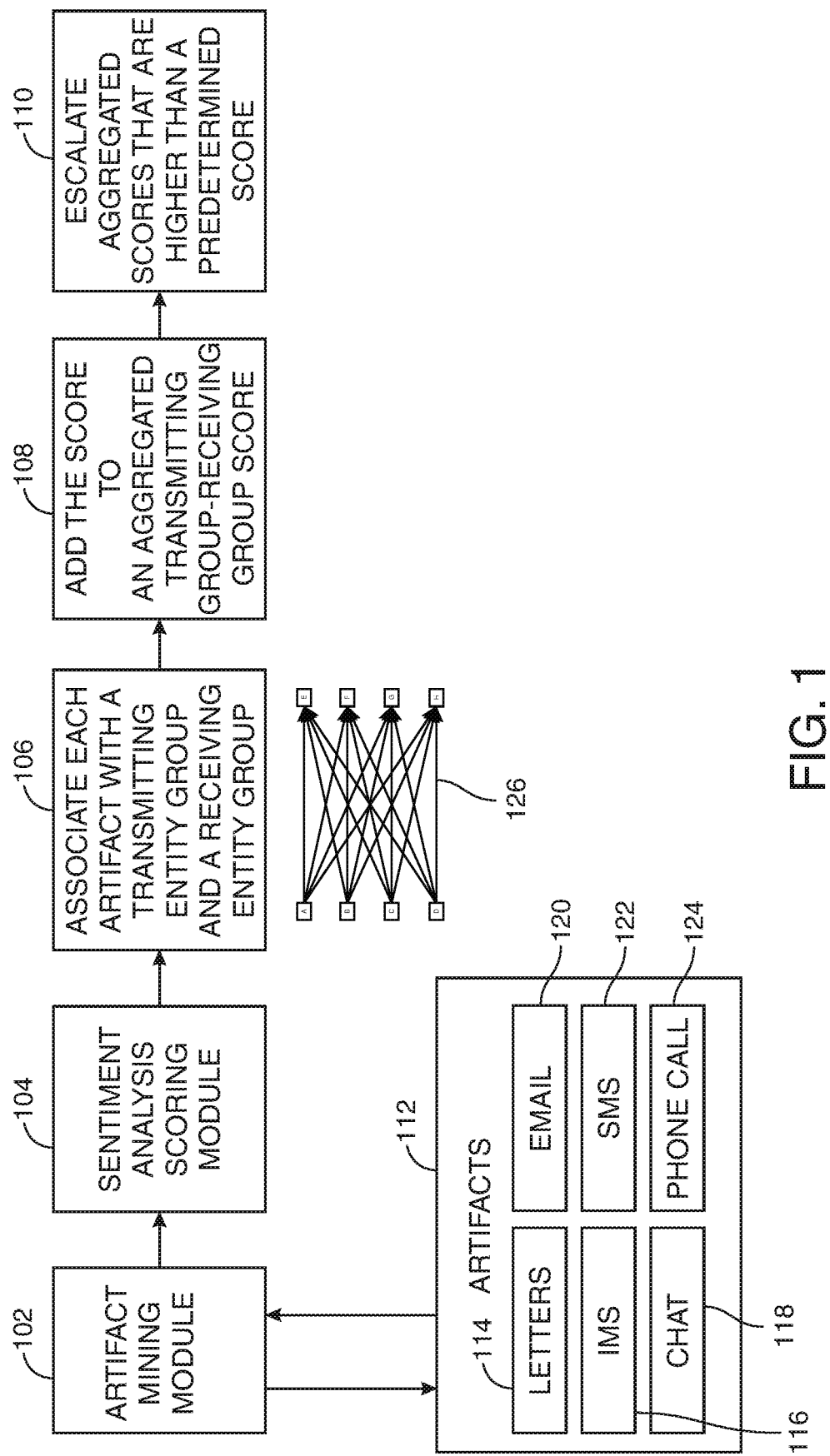
FIG. 1 shows an illustrative diagram in accordance with principles of the disclosure.

A system for aggregating sentiment analysis of communications between a plurality of entity groups is provided. The system may include a plurality of entity groups. Each entity group may include one entity, two entities or a plurality of entities.

The system may include a plurality of communications. Each of the communications may be transmitted from a first entity. The first entity may be included in a first entity group. The first entity group may be included in the plurality of entity groups.

Each of the communications may be transmitted to a second entity. The second entity may be included in a second entity group. The second entity group may be included in the plurality of entity groups.

The system may also include a sentiment score determination module. The sentiment score determination module may determine an aggregate sentiment score for the plurality of communications. The aggregate sentiment score may be used to determine a level of real or perceived threats of the plurality of communications.

The sentiment score determination module may also be configured to determine an aggregate sentiment score for a second plurality of communications. The second plurality of communications may be transmitted from the second entity to the first entity.

The sentiment score determination module may also be configured to determine an aggregate score for a third plurality of communications. The third plurality of communications may be transmitted from a third entity to the second entity.

The sentiment score determination module may also be configured to determine an aggregate sentiment score for a fourth plurality of communications. The fourth plurality of communications may be transmitted form the second entity to the third entity.

The sentiment score determination module may determine the aggregate sentiment score based on natural language processing, computational linguistics, biometrics and text analysis, as described above.

The sentiment score determination module may determine a sentiment score for each communication included in the plurality of communications. The sentiment score determination module may also determine a transmitting entity for each communication included in the plurality of communications. The sentiment score determination module may determine a receiving entity for communication included in the plurality of communications. The sentiment score determination module may determine a first entity group comprising the transmitting group. The sentiment score determination module may determine a second entity group comprising the receiving entity. The sentiment score determination module may identify a communication link between the first entity group and the second entity group.

The sentiment score determination module may add the determined sentiment score to the aggregated sentiment score. The aggregated sentiment score may be associated with the identified communication link.

In some embodiments, the first entity group and the second entity group may be the same entity group.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative diagram. Artifact mining module, shown at 102, may mine a plurality of artifacts, as shown at 112. The plurality of artifacts may include letters 114, IMS 116, chat 118, email 120, SMS ("Short message service") 122 and phone call 124.

Upon retrieval of one or more artifacts by artifact mining module 102, sentiment analysis scoring module 104 may analyze each of the artifacts. The artifacts may be analyzed based on a variety of different scoring models. The variety of different scoring models may include a polarity-based scoring model, a vector-based multi-dimensional scoring model and a two-dimensional scoring model. The different scoring models will be described in greater detail below.

The sentiment analysis scoring module may determine a score for each artifact. The score may be a composite score retrieved from numerous scoring models. The score may be a single number score. The score may be a vector.

Upon determination of a score for each of the artifacts, a transmitting entity group and a receiving entity group may be determined for each artifact. It should be appreciated that the score determination may occur prior to, simultaneous to or after the transmitting/receiving entity group determination.

Each artifact may be associated with a transmitting entity group and a receiving entity group, as shown at 106.

There may be a graph that shows communications between entities. For example, in a group of 100 entities, 50 of them may be determined to be transmitting entities in such a graph and 50 of them may be determined to be receiving entities in such a graph. The communications between the entities may be shown as lines across the graph, as shown at 126.

In other embodiments, the communication graph may be circular. In such a communication graph, it may be apparent that no specific entity is a transmitting entity and no specific entity is a receiving entity. Each entity can be both a receiving entity and a transmitting entity. Although a horizontal-type graph shows that as well, it becomes clearer in a circular type graph.

After a transmitting entity and a receiving entity are determined, a communication link may be determined. The communication link may link the transmitting entity to the receiving entity. The communication link may be associated with an aggregated score. The aggregated score may be an aggregated sentiment score of all communications between the transmitting entity and the receiving entity. Upon determination of the communication link, the determined score may be added to the aggregated score in order to update the aggregated score. The aggregated score may be updated to reflect the latest artifact. The score may be added to an aggregated transmitting group-receiving group score, as shown at 108.

It should be appreciated that, at times when there are many artifacts included in the aggregated score, each inputted artifact may change the aggregated score slightly because a single artifact within a plurality of many artifacts only changes the average score slightly. As such if there are only a few artifacts used to create an aggregated score, each inputted artifact may make a significant change in aggregated score.

It should be further appreciated that the score of an artifact being inputted into the aggregated score can be done in multiple approaches. One approach may be that the score is weighted based on the number of artifacts already included in the aggregated score. This way ensures that the score does not have to be averaged each time a new artifact is received. Also, this approach allows the artifacts and their scores to be archived as soon as the artifact is entered into the average.

In another approach, the artifact and its score are maintained and the average is completely re-executed each time a new artifact is received.

Scores may range from healthy and productive environment scores to non-healthy and detrimental environment scores. Scores that are greater than a predetermined score—i.e., scores that indicate an environment that may be non-healthy and detrimental may be escalated or weighted, as shown at 110. There may be various remediation measures that may be implemented to lower the score between two entities. The measures may include halting communications between the entities, redirecting communications between the entities to an intermediary and any other suitable remediation measures.

Figure 2:
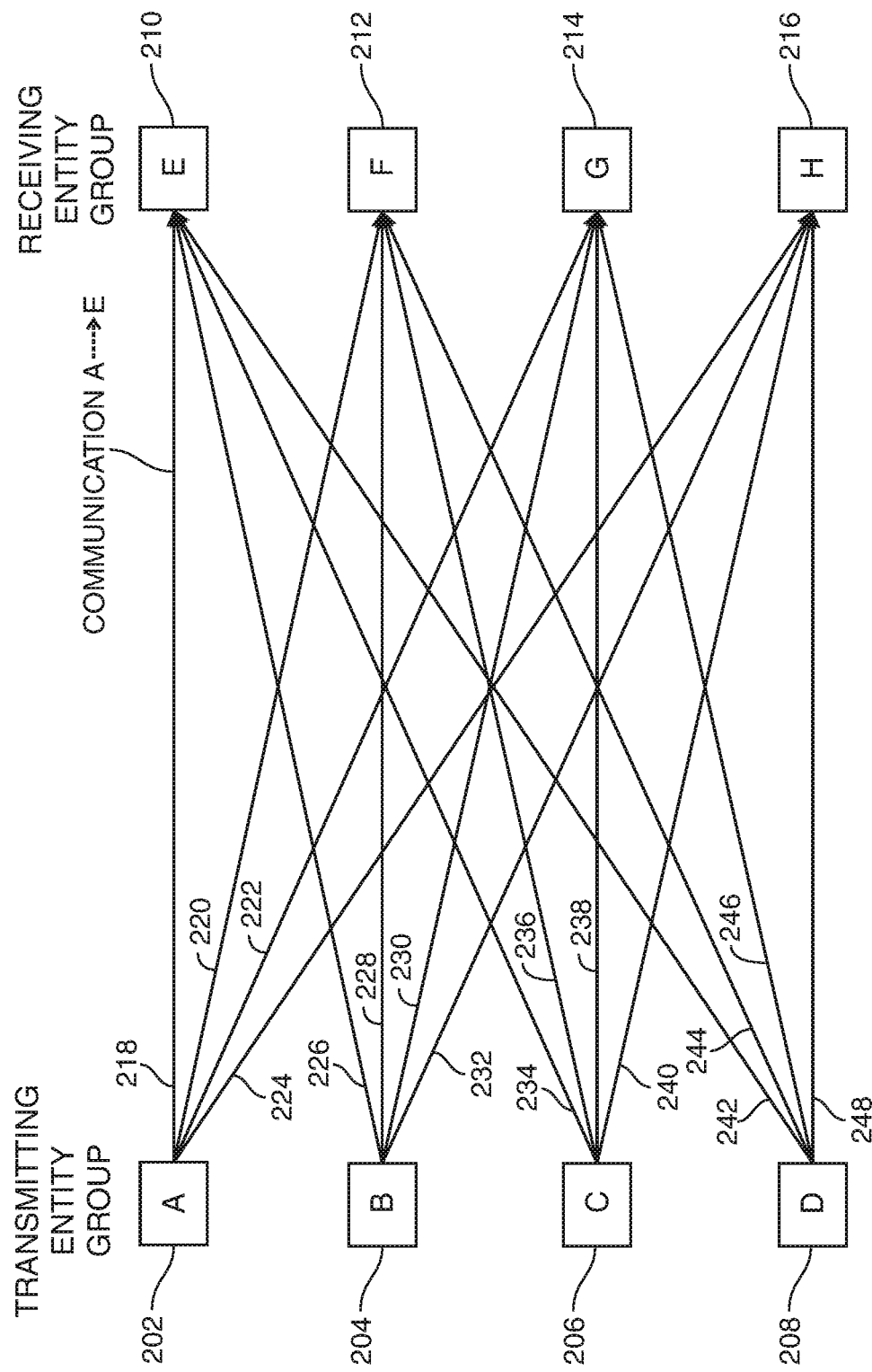
FIG. 2 shows another illustrative diagram in accordance with principles of the disclosure.

FIG. 2 shows an illustrative communications map. The illustrative communications map may include a variety of entity groups. The entity groups shown include entity group A (shown at 202), entity group B (shown at 204), entity group C (shown at 206), entity group D (shown at 208), entity group E (shown at 210), entity group F (shown at 212), entity group G (shown at 214) and entity group H (shown at 216).

Entity groups A, B, C and D are shown as transmitting entity groups. Entity groups E, F, G and H are shown at receiving entity groups. In some embodiments, an entity group may be defined as a transmitting entity group or a receiving entity group. In certain embodiments, an entity group may be considered both a transmitting entity group or a receiving entity group.

Each entity group may be in communication with one or more of the other group entities. The communications between entities may be conducted over communication lines. The communication lines may be virtual communication lines, wired communication lines, wireless communication lines, communication lines that utilize a network or any other suitable communication lines.

Each communication line shown may connect two or more entity groups. It should be appreciated that, although the communication lines shown connect entity groups A, B, C and D to entity groups E, F, G and H, there may be additional communication lines that are not shown. In some embodiments, communication lines may enable communication between entity groups A, B, C and D, and between entity groups E, F, G and H.

Each communication line may enable one-way or two-way communications. Communication lines that enable one-way communication may push communications from a first entity group to a second entity group. Communication lines that enable two-way communications may push communication from a first entity group to a second entity group, and from the second entity group to the first entity group. Communication lines that are one-way may be parallel to a second communication line that enables the reverse of the one-way communication line. For example, if a first communication line enables one-way communication between entity group A and entity group E, a parallel communication line may enable one-way communication between entity group E and entity group A.

Communication lines shown may include 218 (A-E), 220 (A-F), 222 (A-G), 224 (A-H), 226 (B-E), 228 (B-F), 230 (B-G), 232 (B-H), 234 (C-E), 236 (C-F), 238 (C-G), 240 (C-H), 242 (D-E), 244 (D-F), 246 (D-G) and 248 (D-H).

Figure 3:
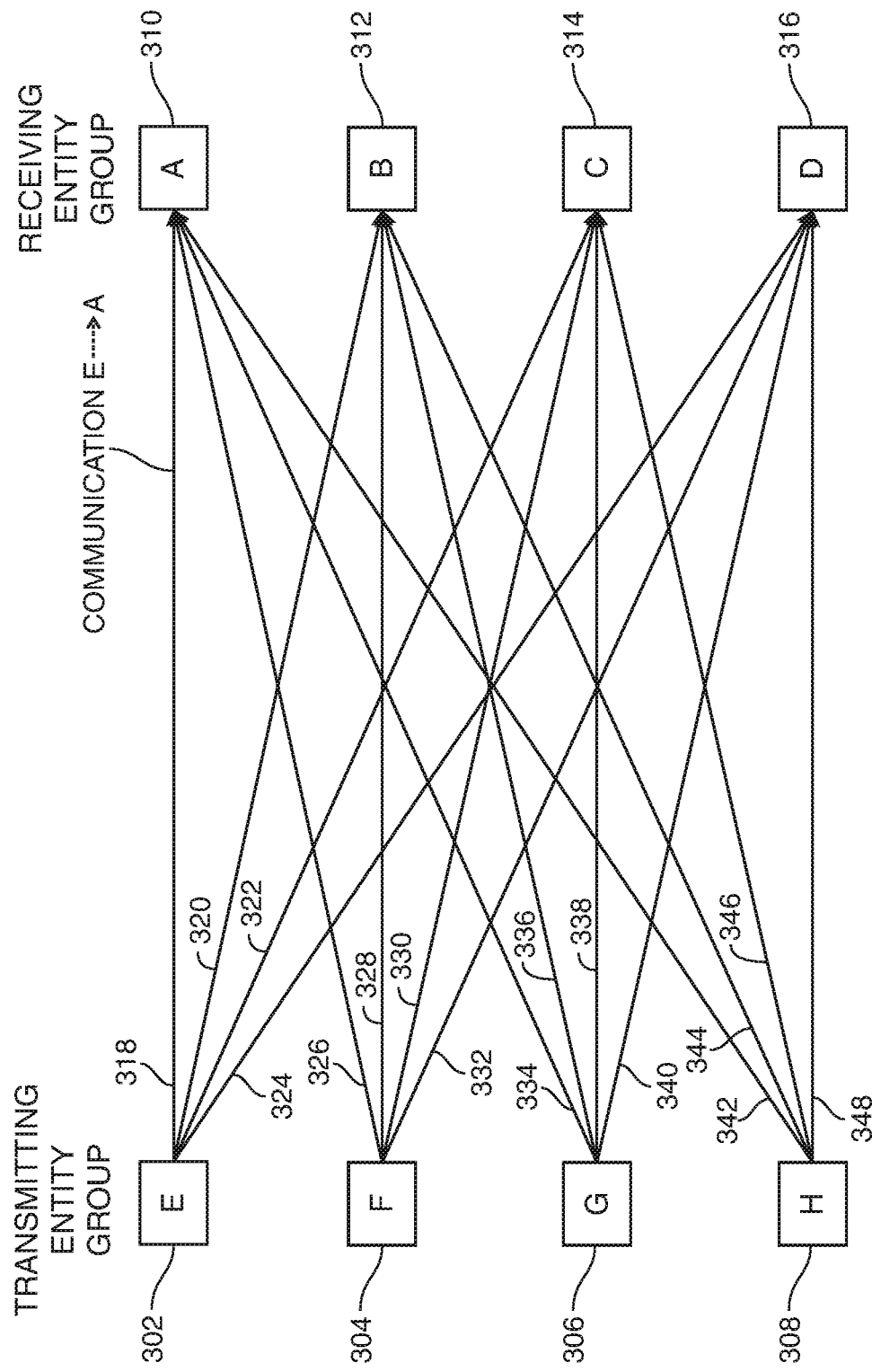
FIG. 3 shows yet another illustrative diagram in accordance with principles of the disclosure.

FIG. 3 shows another illustrative communications map. The communications map may show entity group E (shown at 302), entity group F (shown at 304), entity group G (shown at 306) and entity group H (shown at 308) communicating with entity group A (shown at 310), entity group B (shown at 312), entity group C (shown at 314) and entity group D (shown at 316).

Each communication line shown may connect two or more entity groups. It should be appreciated that, although the communication lines shown connect entity groups E, F, G and H to entity groups A, B, C and D, there may be additional communication lines that are not shown. In some embodiments, communication lines may enable communication between entity groups E, F, G and H, and between entity groups A, B, C and D.

Each communication line may enable one-way or two-way communications. Communication lines that enable one-way communication may push communications from a first entity group to a second entity group. Communication lines that enable two-way communications may push communication from a first entity group to a second entity group, and from the second entity group to the first entity group. Communication lines that are one-way may be parallel to a second communication line that enables the reverse of the one-way communication line. For example, if a first communication line enables one-way communication between entity group A and entity group E, a parallel communication line may enable one-way communication between entity group E and entity group A.

Communication lines shown may include 318 (E-A), 320 (E-B), 322 (E-C), 324 (E-D), 326 (F-A), 328 (F-B), 330 (F-C), 332 (F-D), 334 (G-A), 336 (G-B), 338 (G-C), 340 (G-D), 342 (H-A), 344 (H-B), 346 (H-C) and 348 (H-D).

Figure 4:
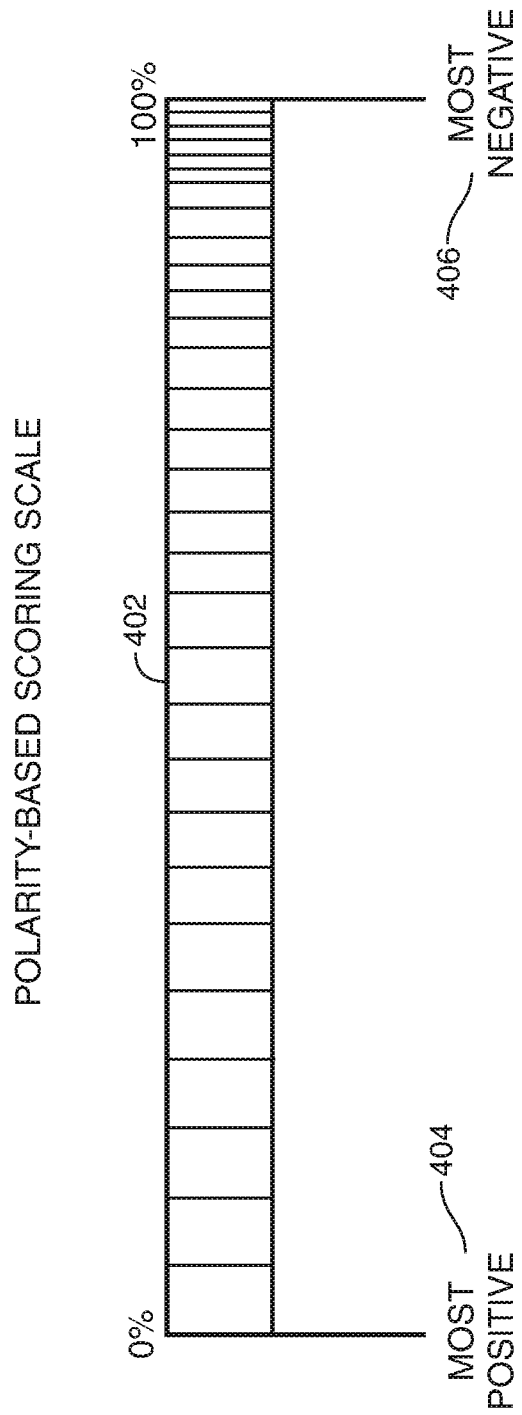
FIG. 4 shows still another illustrative diagram in accordance with principles of the disclosure.

FIG. 4 shows an illustrative scoring scale. There may be various different methods or scales for scoring artifacts as part of an aggregate score. For example, an artifact may be scored based on positive or negative sentiment. An artifact may be scored based on polar emotions, such as happy or sad. An artifact may be scored in a non-polar scale, such as a vector scaling model. An artifact may be scored on a collection of multiple sentiment scoring methods or models.

Polarity-based scoring scale 402 is shown in FIG. 4. In such a scoring scale, each artifact is scored on a polar scale using linguistic scoring methodology. Linguistic scoring methodology may utilize various language scoring methods, such as natural language processing, computational linguistics and biometrics. The language scoring methodology may also include text analysis. The text analysis may analyze various components of the text. It should be appreciated that, to a human reader, certain text components, such as sarcasm, exaggerations or jokes may be easily understood. However, a computer may require special methods to ensure that such linguistic terms are not misinterpreted. Therefore, the text analysis may analyze key words and phrases, emoticons, characters, length of response, response time between artifacts, related artifacts, negation, exaggeration, jokes and sarcasm. Based on the linguistic scoring methodology, each artifact may be scored on a scale of 0% to 100%, as shown at 404 and 406. 0% may indicate most positive and 100% may indicate most negative.

It should be appreciated that a polarity-based scale may include two opposite emotions, whether positive and negative, happy and sad or any other suitable opposite emotions. Therefore, each artifact scored on a polarity-based score may only be given a score based on the polarity of the artifact. However, at times, in order to compensate for the shortcomings of the polarity-based scoring models, an artifact may be scored on multiple polarity-based scoring models, and, the results of the scoring models may be combined.

Figure 5:
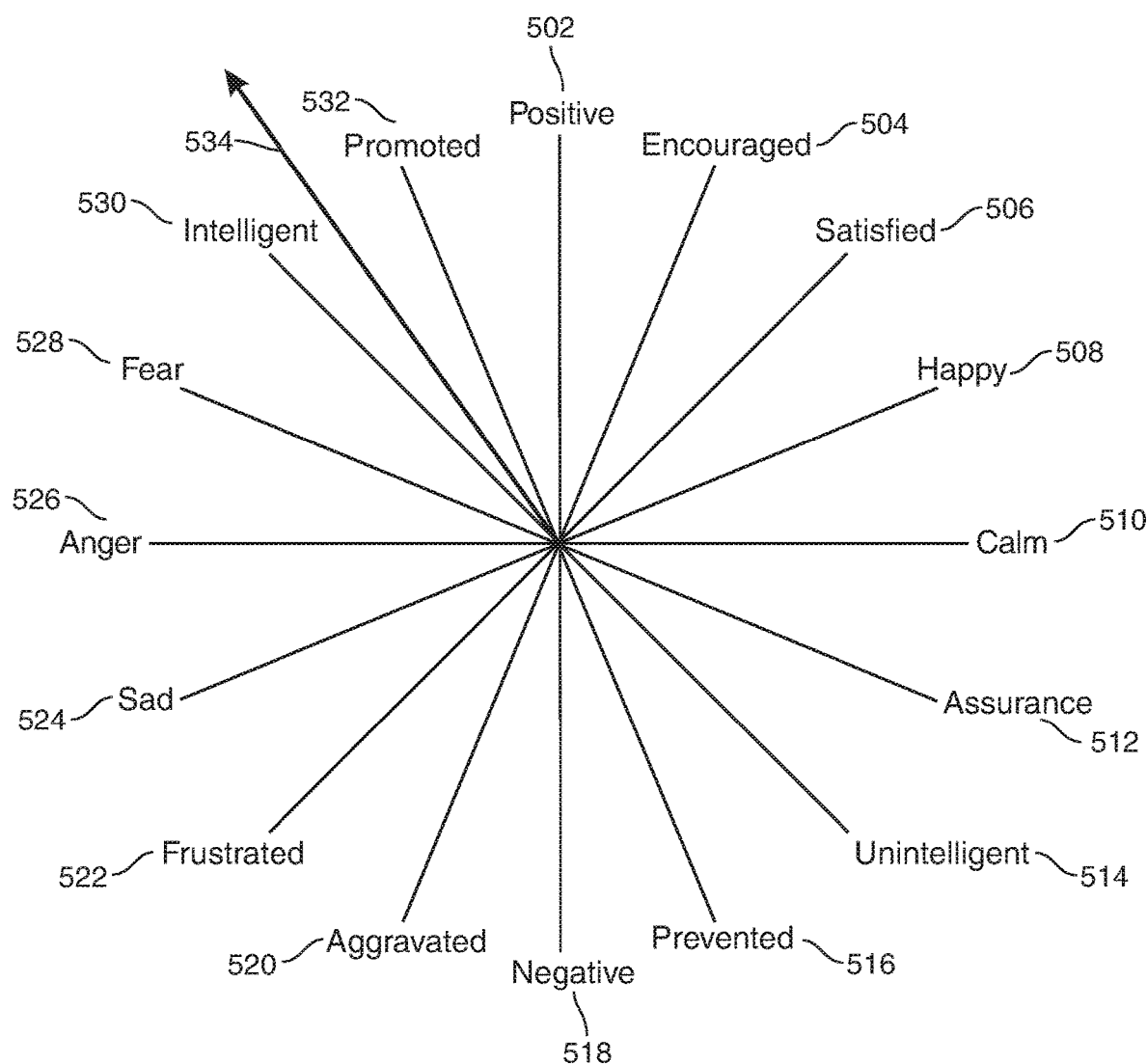
FIG. 5 shows yet another illustrative diagram in accordance with principles of the disclosure.

FIG. 5 shows a multi-dimensional scoring scale. The multi-dimensional scoring scale may include a plurality of vectors. Each of the vectors may correspond to a different emotion or sentiment. The emotions, or sentiments shown, may include positive (502), encouraged (504), satisfied (506), happy (508), calm (510), assurance (512), unintelligent (514), prevented (516), negative (518), aggravated (520), frustrated (522), sad (524), anger (526), fear (528), intelligent (530) and promoted (532).

Vector 534 may be a vector generated from an artifact. The artifact may include a plurality of attributes. The artifact may be broken down into component parts. The attributes and the component parts may be used to plot the artifact on the multi-dimensional scoring scale.

The sentiment of the artifact plotted as vector 534 may be shown in-between intelligent and promoted. It should be appreciated that the multi-dimensional scoring scale may be used to determine the sentiment of an artifact. The multi-dimensional scoring scale may include a plurality of other emotions, not shown. In some embodiments, the multi-dimensional scoring scale may utilize any suitable emotion chart.

Figure 6:
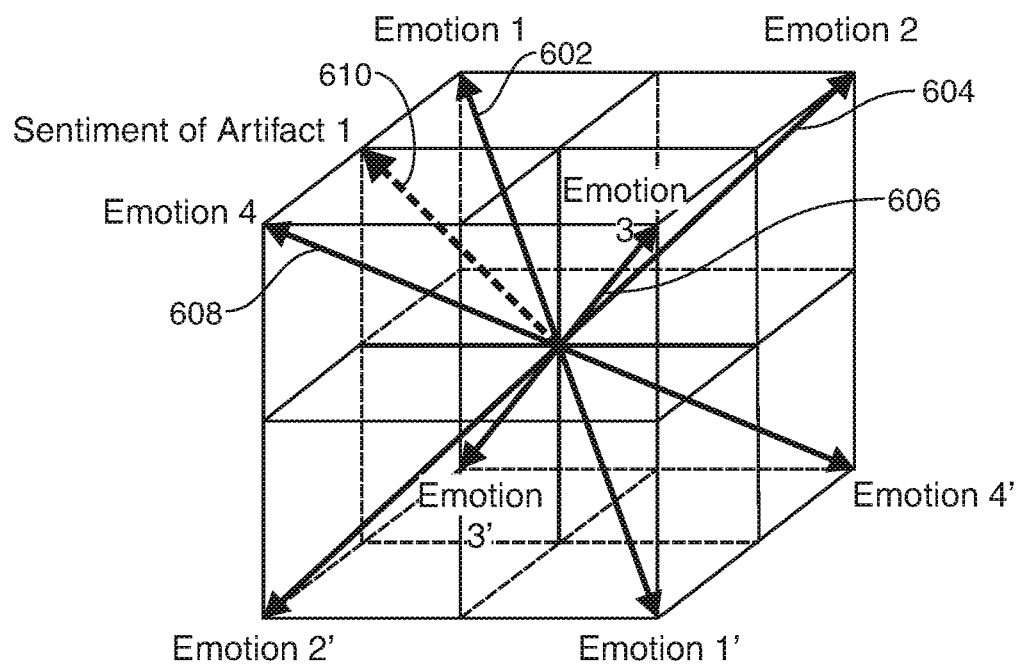
FIG. 6 shows still another illustrative diagram in accordance with principles of the disclosure.

FIG. 6 shows another multi-dimensional scoring scale. The multi-dimensional may be three-dimensional. The three-dimensional scoring scale may include an x-dimension (horizontal), a y-dimension (vertical) and a z-dimension (depth). Vectors that represent emotions may be plotted on the three-dimensional scoring scale.

A vector may have multiple dimensions, such as an x-dimension, a y-dimension and a z-dimension. As such, a vector may be plotted on the three-dimensional scoring scale that comprises an x-dimension, y-dimension and z-dimension. Each plotted emotion may be represented by a vector, such as vector 602 that represents emotion 1, vector 604 that represents emotion 2, vector 606 that represents emotion 3 and vector 608 that represents emotion 4.

Build of a vector, or orientation of a vector, could be based on one or more of a combination of sentiments or emotions. In some embodiments, vector length could correspond to magnitude or intensity of a vector.

Each plotted vector that represents an emotion may have two extremes. For example, a vector may represent a range of happiness and sadness. Each point of the vector may represent a different extreme in the range of happiness and sadness. At the (0,0,0) point, the vector may represent neutrality (neither happy nor sad). Location points found on the vector above the (0,0,0) point may represent a gradually increasing degree of happiness, while location points found below the (0,0,0) point may represent a gradually increasing degree of sadness.

Upon the receipt of an unlabeled artifact, the artifact may be broken down into component parts. The component parts may be used to generate a vector. The vector may be plotted on a multi-dimensional scoring scale, such as the one shown in FIG. 6. Such a vector may be shown at 610. Vector 610 may represent the sentiment of artifact 1. Because sentiment of an artifact may be multi-faceted—i.e., may include multiple emotions, vector 610 may represent the sentiment of artifact 1 with respect to the emotion vectors.

In some embodiments, the emotion vector, or vectors, that most closely represents the sentiment of the artifact may be displayed to a user. In certain embodiments, a detailed score comprising the various components of the artifact may be shown. For example, an artifact may be determined to include 20% happiness, 40% kindness, 30% caring and 10% consideration. For such an artifact, the entire breakdown may be shown and/or the single most dominant attribute—kindness may be shown. In some embodiments, the only displayed sentiment may be positive or negative.

FIG. 7 shows an exemplary sentiment analysis report. The exemplary sentiment analysis report may be for communications between entity groups A and E. In the sentiment analysis report shown, the various categories of communications may be analyzed separately. The categories shown may include letters (702), IMS (704), chat (706), email (708), SMS (710) and phone call (712). The analysis for each of the categories may be shown at 714 (letter analysis), 716 (IMS analysis), 718 (chat analysis), 720 (email analysis), 722 (SMS analysis) and 724 (phone call analysis). It should be appreciated that the analysis shown in FIG. 7 may be based on a polarity-based scoring model, however, any suitable scoring model may be used to generate an analysis.

In some embodiments, different communication types may be weighted differently—i.e., not all communications may carry the same weight.

Such a sentiment analysis report may be useful in determining which category of communication is most effective between two entity groups. Specifically, if one communication mode is more effective than another communication mode—i.e., a first communication mode is determined to include significantly more positive communications than a second communication mode—appropriate remediation measures may be instituted to encourage the use of the more effective communication mode.

Also, in the event that the communications between a first entity group and a second entity group is more positive than the communications between the first entity group and a third entity group, collaboration between the first entity group and the third entity group may be halted or diminished.

Thus, an aggregated sentiment analysis system for threat protection is provided. Persons skilled in the art will appreciate that the present invention can be practiced by other than the described embodiments, which are presented for purposes of illustration rather than of limitation. The present invention is limited only by the claims that follow.

What is claimed is:

1. A method for aggregating the sentiment analysis of the communications between a first entity group and a second entity group, the method comprising:
   mining a plurality of artifacts, each of said plurality of artifacts comprising:
      a transmitting entity;
      a receiving entity; and
      a communication mode, said communication mode being selected from the group consisting of instant messaging services ("IMSs"), chats, emails, short message services ("SMSs") and transcribed phone calls;
   for each artifact:
      determining a sentiment score for the artifact, the sentiment score being based on:
         natural language processing;
         computational linguistics;
         biometrics; and
         text analysis, the text analysis analyzing:
            key words and phrases;
            emoticons;
            characters;
            length of response;
            response time between artifacts;
            related artifacts;
            negation;
            exaggerations;
            jokes; and/or
            sarcasm;
      determining a transmitting entity of the artifact;
      determining a receiving entity of the artifact;
      determining the first entity group comprising two or more entities, the two or more entities comprising the transmitting entity;
      determining the second entity group comprising two or more entities, the two or more entities comprising the receiving entity;
      adding the sentiment score to an aggregated sentiment score, said aggregated sentiment score being associated with a communication link, said communication link linking the first entity group and the second entity group;
      generating an aggregated sentiment score for the communication link;
   grouping the plurality of artifacts into a plurality of artifact groups, where each artifact group corresponds to a single communication mode;
   identifying a communication mode sentiment score for each artifact group;
   selecting the artifact group, from the plurality of artifact groups, that corresponds to a single communication mode that includes more positive communications than the other communication modes, as the most effective communication mode between the first entity group and the second entity group; and
   encouraging, for communications between the first entity group and the second entity group, the use of the communication mode that corresponds to the selected artifact group, said encouraging comprising blocking communications, between the first entity group and the second entity group, that are transmitted via the other communication modes.

2. The method of claim 1 further comprising identifying communication links that include an aggregated sentiment score that are above a predetermined threshold.

3. The method of claim 2 further comprising escalating the identified communication links.

4. The method of claim 3 wherein the escalating further comprises halting all communications between the first entity group and the second entity group associated with the communication links.

5. The method of claim 1 wherein the transmitting entity and the receiving entity are the same entity.

6. The method of claim 1 wherein the first entity group comprises two or more other transmitting entities.

7. The method of claim 1 wherein the second entity group comprises two or more receiving entities.

8. A method for aggregating the sentiment analysis of communications between a plurality of entity groups, the method comprising:
- identifying a plurality of entity groups, each entity group comprising two or more entities;
- identifying a plurality of communication links, each of the communication links linking an entity, included in an entity group included in the plurality of entity groups, to another entity, included in an entity group included in the plurality of entity groups, each communication link being associated with an individual aggregated sentiment score;
- mining a plurality of artifacts, each artifact included in the plurality of artifacts being transmitted from an entity, included in an entity group included in the plurality of entity groups, to another entity, included in an entity group included in the plurality of entity groups;
- determining a sentiment score for each of the plurality of artifacts;
- identifying a communication mode for each of the plurality of artifacts, the communication mode being selected from the group consisting of instant messaging services ("IMSs"), chats, emails, short message services ("SMSs") and transcribed phone calls;
- labeling each artifact with:
  - the communication mode;
  - the sentiment score;
  - the entity from which the artifact was transmitted; and
  - the entity to which the artifact was transmitted;
- for each artifact, updating an aggregated sentiment score that corresponds to the communication link, said communication link that corresponds to both the entity from which the artifact was transmitted and the entity to which the artifact was transmitted;
- determining a communication threat level associated with the aggregated sentiment score;
- grouping the plurality of artifacts into a plurality of artifact groups, where each artifact group corresponds to a single communication mode;
- identifying a communication mode sentiment score for each artifact group; and
- for each communication link:
  - selecting the artifact group, from the plurality of artifact group, that corresponds to a single communication mode that includes more positive communications that the other communication mode, as the most effective communication mode between the entities associated with the communication link; and
  - encouraging the use of the communication mode that corresponds to the selected artifact group, said encouraging comprising blocking communications that are transmitted via the other communication modes.

9. The method of claim 8 wherein the entity from which the artifact was transmitted and the entity to which the artifact was transmitted are the same entity.

10. The method of claim 9 wherein the communication link that corresponds to both the entity from which the artifact was transmitted and the entity to which the artifact was transmitted is a self-referential communication link.

11. The method of claim 10 wherein the aggregated sentiment score associated with the self-referential communication link identifies sentiment within an entity.

12. The method of claim 8 further comprising identifying communication links that include a sentiment score above a predetermined threshold.

13. A system for aggregating sentiment analysis of communications between a plurality of entity groups, the system comprising:
- a plurality of entity groups, each entity group comprising two or more entities;
- a plurality of communications, each of the communications comprising a communication mode, the communication mode being selected from the group consisting of instant message services ("IMSs"), chats, emails, short message services ("SMSs") and transcribed phone calls, each of the communications being transmitted from a first entity, said first entity being included in a first entity group included in the plurality of entity groups, to a second entity included in a second entity group included in the plurality of entity groups; and
- a sentiment score determination module configured to:
  - group the plurality of communications into a plurality of communication groups, where each communication group corresponds to a single communication mode;
  - determine an aggregate communication mode sentiment score for each of the plurality of communication groups;
  - select the communication group, from the plurality of communication groups, that corresponds to a single communication mode that includes more positive communications that the other communication modes, as the most effective communication mode between the first entity group and the second entity group; and
  - encourage the use of the communication mode that corresponds to the selected communication group by blocking communications that are transmitted via the other communication modes.

14. The system of claim 13 wherein the sentiment score determination module is further configured to determine an aggregate sentiment score for a second plurality of communications, said second plurality of communications being transmitted from the second entity to the first entity.

15. The system of claim 14 wherein the sentiment score determination module is further configured to determine an aggregate sentiment score for a third plurality of communications, the third plurality of communications being transmitted from a third entity to the second entity.

16. The system of claim 15 wherein the sentiment score determination module is further configured to determine an aggregate sentiment score for a fourth plurality of communications, the fourth plurality of communications being transmitted from the second entity to the third entity.

17. The system of claim 13 wherein the sentiment score determination module determines the aggregate communication mode sentiment score based on:
   natural language processing;
   computational linguistics;
   biometrics; and
   text analysis.

18. The system of claim 17 wherein the text analysis comprises analysis of:
   key words and phrases;
   emoticons;
   characters;
   length of response;
   response time between artifacts;
   related artifacts;
   negation;
   exaggerations;
   jokes; and/or
   sarcasm.

19. The system of claim 18 wherein the sentiment score determination module is configured to:
   determine a sentiment score for each communication included in the plurality of communications;
   determine a transmitting entity for each communication included in the plurality of communications;
   determine a receiving entity for each communication included in the plurality of communications;
   determine a first entity group comprising the transmitting entity;
   determine a second entity group comprising the receiving entity;
   identify a communication link between the first entity group and the second entity group; and
   add the determined sentiment score to the aggregated sentiment score, said aggregated sentiment score being associated with the identified communication link.

20. The system of claim 13, wherein the first entity group and the second entity group are the same entity group.

* * * * *